US009232488B2

(12) United States Patent
Ebrahimi Tazeh Mahalleh et al.

(10) Patent No.: US 9,232,488 B2
(45) Date of Patent: Jan. 5, 2016

(54) ALIGNING TIMING FOR DIRECT COMMUNICATIONS

(71) Applicant: Research In Motion Limited, Waterloo (CA)

(72) Inventors: Masoud Ebrahimi Tazeh Mahalleh, Ottawa (CA); William Anthony Gage, Stittsville (CA); Biswaroop Mukherjee, Stittsville (CA); Robert Novak, Stittsville (CA)

(73) Assignee: RESEARCH IN MOTION LIMITED, Waterloo, Ontario (CA)

( * ) Notice: Subject to any disclaimer, the term of this patent is extended or adjusted under 35 U.S.C. 154(b) by 219 days.

(21) Appl. No.: 13/854,515

(22) Filed: Apr. 1, 2013

(65) Prior Publication Data
US 2014/0293968 A1     Oct. 2, 2014

(51) Int. Cl.
| | |
|---|---|
| *H04J 3/00* | (2006.01) |
| *H04W 56/00* | (2009.01) |
| *H04W 76/04* | (2009.01) |
| *H04L 5/00* | (2006.01) |

(52) U.S. Cl.
CPC .......... *H04W 56/001* (2013.01); *H04W 56/004* (2013.01); *H04L 5/0053* (2013.01); *H04L 5/0092* (2013.01); *H04W 76/043* (2013.01)

(58) Field of Classification Search
CPC ...................................... H04W 56/004–56/005
See application file for complete search history.

(56) References Cited

U.S. PATENT DOCUMENTS

| | | | |
|---|---|---|---|
| 2012/0258706 A1* | 10/2012 | Yu et al. | 455/426.1 |
| 2014/0099950 A1* | 4/2014 | Mildh et al. | 455/434 |

FOREIGN PATENT DOCUMENTS

| | | |
|---|---|---|
| WO | 2013/002688 | 1/2013 |
| WO | 2013/181394 | 12/2013 |

OTHER PUBLICATIONS

International Search Report and Written Opinion of the International Searching Authority issued in International Application No. PCT/CA2014/000300 on Jul. 22, 2014; 9 pages.
3GPP TSG SA Plenary Meeting #53; SP-110683, TSG SA WG1, "WID on Proposal for a study on Proximity-based Services," Sep. 19-21, 2011; 5 pages.
3GPP TR 22.803, "Feasibility Study for Proximity Services (ProSe)," version 0.2.0, Feb. 2012; 19 pages.
RP-120698, "Study on LTE Direct Communication," 3GPP TSG RAN Meeting #56, Jun. 13-15, 2012.
Qualcomm, RP-121435, "Study on LTE Device to Device Proximity Discovery," 3GPP TSG RAN Meeting #57, Sep. 2012.
RWS-120045, TSG-RAN Chairman, "Summary of 3GPP TSG-RAN Workshop on Release 12 and Onward," 3GPP Workshop on Release 12 and Onwards, Jun. 11-12, 2012; 6 pages.

(Continued)

*Primary Examiner* — Chi H Pham
*Assistant Examiner* — Fahmida Chowdhury
(74) *Attorney, Agent, or Firm* — Fish & Richardson P.C.

(57) ABSTRACT

In some implementations, a method includes compensating for timing misalignment of subframes associated with at least one of first user equipment (UE) or a second UE. The first UE and the second UE are in an inter-device session (IDS) for direct UE-to-UE communication, and timing for the first UE and a timing for the second UE is derived from an eNode B (eNB).

28 Claims, 9 Drawing Sheets

(56) References Cited

OTHER PUBLICATIONS

Dahlman et al. "4G LTE/LTE-Advanced for Mobile Broadband", Academic Press, 2011; 447 pages.

3GPP TS 36.211, "3rd Generation Partnership Project; Technical Specification Group Radio Access Network; Evolved Universal Terrestrial Radio Access (E-UTRA); Physical channels and modulation (Release 10)," version 10.0.0, Dec. 2010; 105 pages.

* cited by examiner

ALIGNING TIMING FOR DIRECT COMMUNICATIONS

TECHNICAL FIELD

This disclosure relates to aligning timing for direct communications.

BACKGROUND

An inter-device session (IDS) encompasses scenarios where two or more devices directly communicate data through a shared radio channel. For a given IDS resource allocation, one User Equipment (UE) device in the session transmits data in the allotted resource, and another UE in the session receives data in that allotted resource. An associate wireless network may allocate the IDS resource from uplink (UL) or from downlink (DL) resources or from both.

In a Long Term Evolution (LTE) system, an evolved Node B (eNB) allocates resources for the IDS to UEs. Using the allocated resources, the UEs directly transmit data traffic for the IDS, and the eNB may control operational aspects of the IDS. For example, the eNB may transmit, to the UEs, control information using a Physical Downlink Control Channel (PDCCH), or other downlink signal. The control information can include a resource allocation, a Modulation and Coding Scheme (MCS) for traffic, a power control command, or other information.

In LTE DL transmissions, the data of different UEs are multiplexed in the frequency domain (subcarriers), and a single OFDM symbol is formed by applying an inverse fast Fourier transform (IFFT) across all subcarriers and appending a cyclic prefix (CP). At the receiver (UE) side, the CP of the OFDM symbol is discarded and FFT is applied to the remaining portion of the received symbol to convert the data from the time domain to the frequency domain. The UE demultiplexes the converted data in the frequency domain. The time-window over which the FFT is applied should be aligned with the received OFDM symbol to avoid inter-symbol interference (ISI) and inter-carrier interference (ICI). Each UE may execute time-alignment (or time-synchronization) to DL signals from the eNB in an open loop manner using the synchronization signals that the eNB broadcasts.

Time-alignment for UL signals is different than for DL signals. At the receiver side for UL signals, i.e., at eNB, OFDM symbols from multiple UEs are superimposed and processed at the same time. Although different UEs are orthogonal in the frequency domain, for the receiver to be able to detect all UEs' data with a single FFT operation, all the OFDM symbols should arrive at the eNB approximately time-aligned. Misalignment of different OFDM symbols can cause ICI and performance degradation. Time-alignment for UL signals in LTE systems is carried out in a closed loop manner. At initial access to the LTE system, which uses a physical random access channel (PRACH), each UE's transmission is based on the DL timing acquired through DL synchronization signal. Due to a round-trip delay, the initial transmission of the UE arrives with some delay relative to UL timing for the eNB. The eNB measures this delay based on the PRACH signal received from the UE and transmits a timing advance command to the UE to advance UL transmissions by a certain amount of time. The timing advance is an integer multiple of $16T_s$ (or about 0.52 μsec), where $T_s$ is the sampling period of the OFDM system. Using the timing advance command, the UE corrects the transmission timing and the next transmission arrives at the eNB approximately aligned with the UL symbol timing of the eNB. As the UE may move and the propagation delay may change, the time alignment procedure periodically repeats. After the initial access using PRACH, the delay may be later measured using PRACH signals or the SRS.

DETAILED DESCRIPTION

Figure 2:
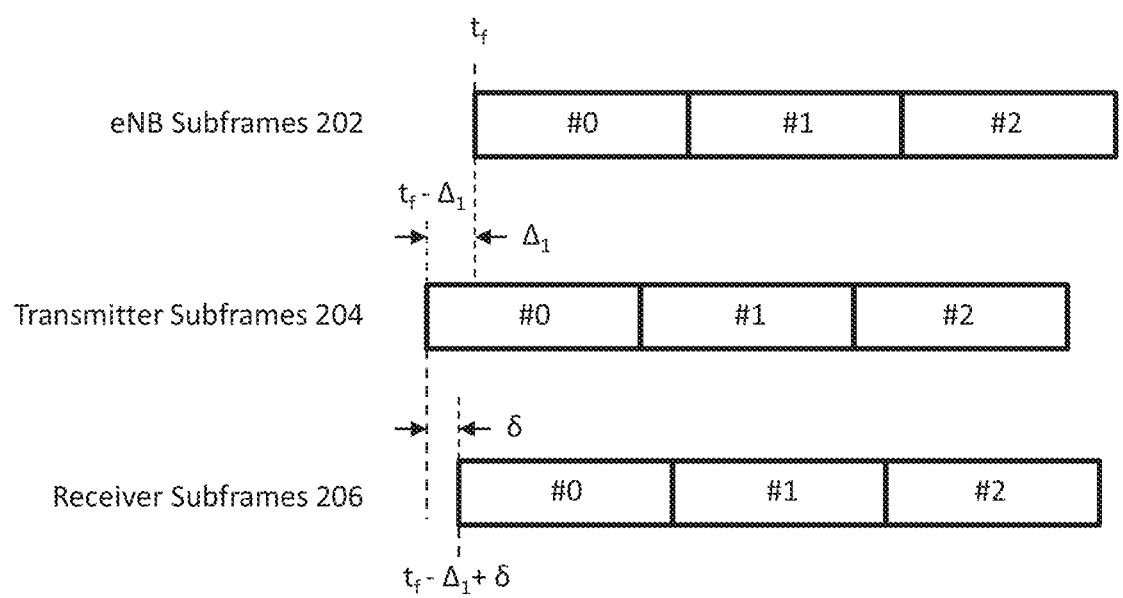
FIG. 2 is a schematic illustrating example subframes with adjusted receive timing.
Figure 3:
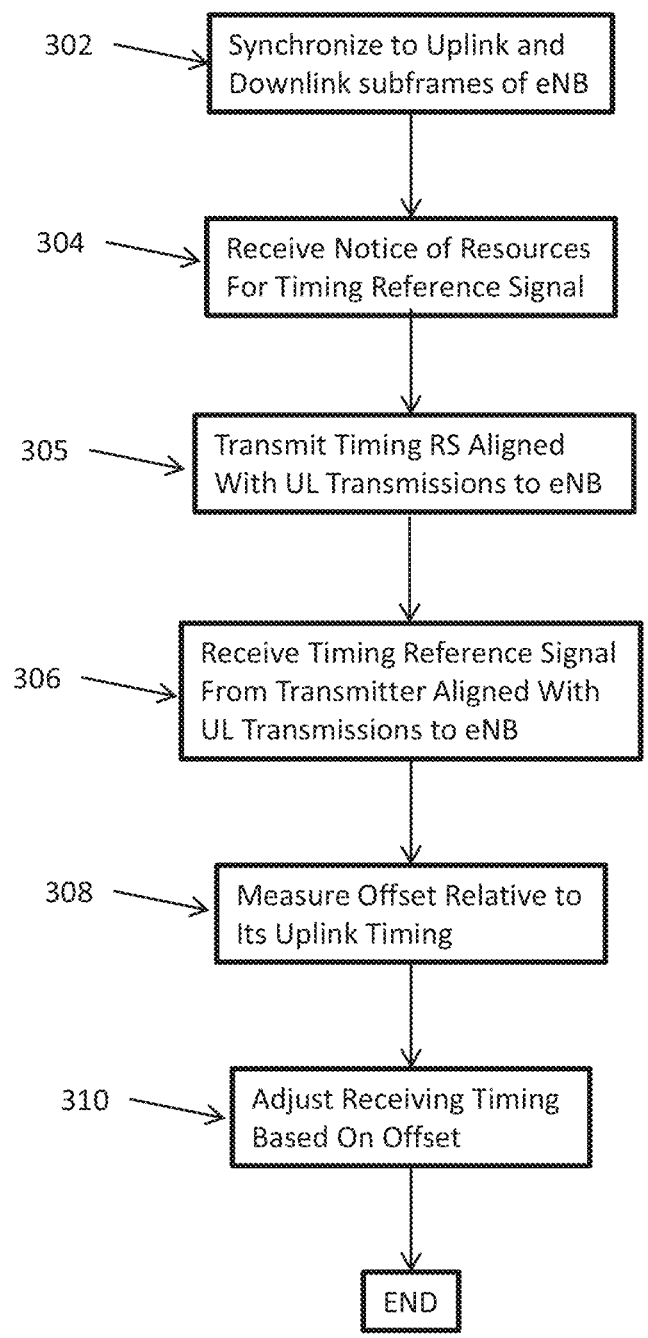
FIG. 3 is a flowchart illustrating an example method for determining an adjustment for the receive timing.

The present disclosure is direct to timing alignment associated with an IDS. In an OFDMA-based system, time misalignment may cause interference (e.g., inter-UE interference, UE-PDCCH interference) and consequently performance degradation. As described in more detail below, the time-misalignment interference may be eliminated, minimized, or otherwise reduced using one or more of the following: adjusting receive timing; adjusting transmit timing; adding guard periods; adding guard subcarriers; avoiding D2D transmissions in the PDCCH; or others. In regard to adjusting receive timing, a D2D receiver may adjust the receive timing to substantially align with the timing of the arriving subframe from the D2D transmitter. In these instances, the eNB may initially allocate resources to the D2D transmitter and receiver of resources for a timing reference signal (RS). The D2D transmitter may send, to the D2D receiver, the timing RS using the allocated resources. In these instances, the transmit timing is typically aligned with UL transmissions to the eNB. For example, the transmit timing may start at $t_f - \Delta_1$ where $t_f$ is the start of the UL subframe reception at the eNB and $\Delta_1$ is the propagation delay between the eNB and the D2D transmitter. The D2D receiver detects the timing RS and measures the offset relative to its receive timing, which is initially the same as UL timing. In these instances, eNB has allocated UL resources so the receive timing for the D2D receiver is $t_f - \Delta_2$ where $\Delta_2$ is the propagation delay between the eNB and the D2D receiver, so the measured offset may be equal to $\delta + \Delta_2 - \Delta_1$ where $\delta$ is the propagation delay between the D2D transmitter and the D2D receiver. Once determined, the D2D receiver may adjust the receive timing in the subframes used for the D2D link to $(t_f - \Delta_2) + (\delta + \Delta_2 - \Delta_1) = t_f - \Delta_1 + \delta$. FIGS. 2 and 3 and associated description provided additional details of these implementations.

Figure 4:
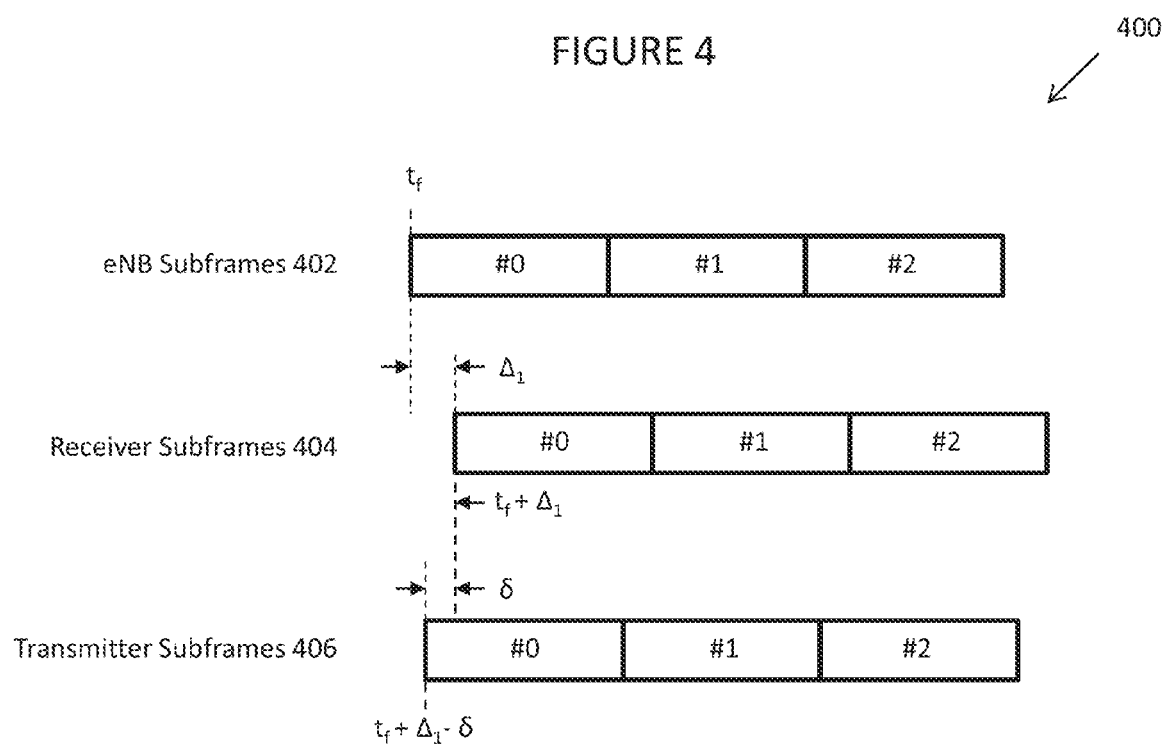
FIG. 4 is a schematic illustrating example subframes with adjusted transmit timing.
Figure 5:
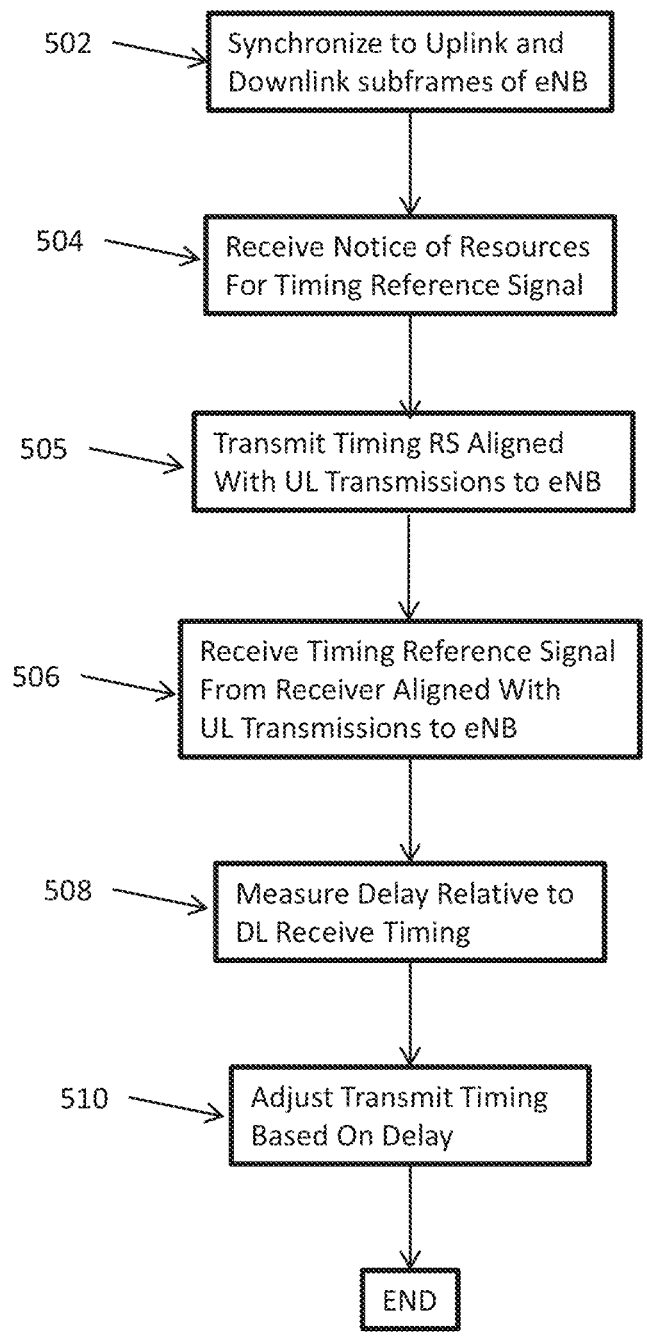
FIG. 5 is a flowchart illustrating an example method for determining an adjustment for the transmit timing.

In regard to adjusting the transmit timing, the D2D transmitter adjusts the transmit timing to substantially align the D2D subframe with the DL subframe when it arrives at the receiver of the D2D link. In some implementations, the receiver can send a timing RS based on predetermined timing. The transmission of the timing RS may be transmitted in accordance with the timing of the UL subframe (SF). Using this signal and assuming channel reciprocity, the transmitter may measure the delay of the D2D link and adjust the transmission timing based on the delay of the D2D link. In some implementations, the transmitter can send the timing RS signal instead of the receiver. In these instances, the D2D receiver may measure the timing misalignment and issue a timing adjustment command to the D2D transmitter. The D2D receiver may send the command directly to the D2D transmitter or indirectly through the eNB. FIGS. 4 and 5 and associated description provided additional details of these implementations.

Figure 6:
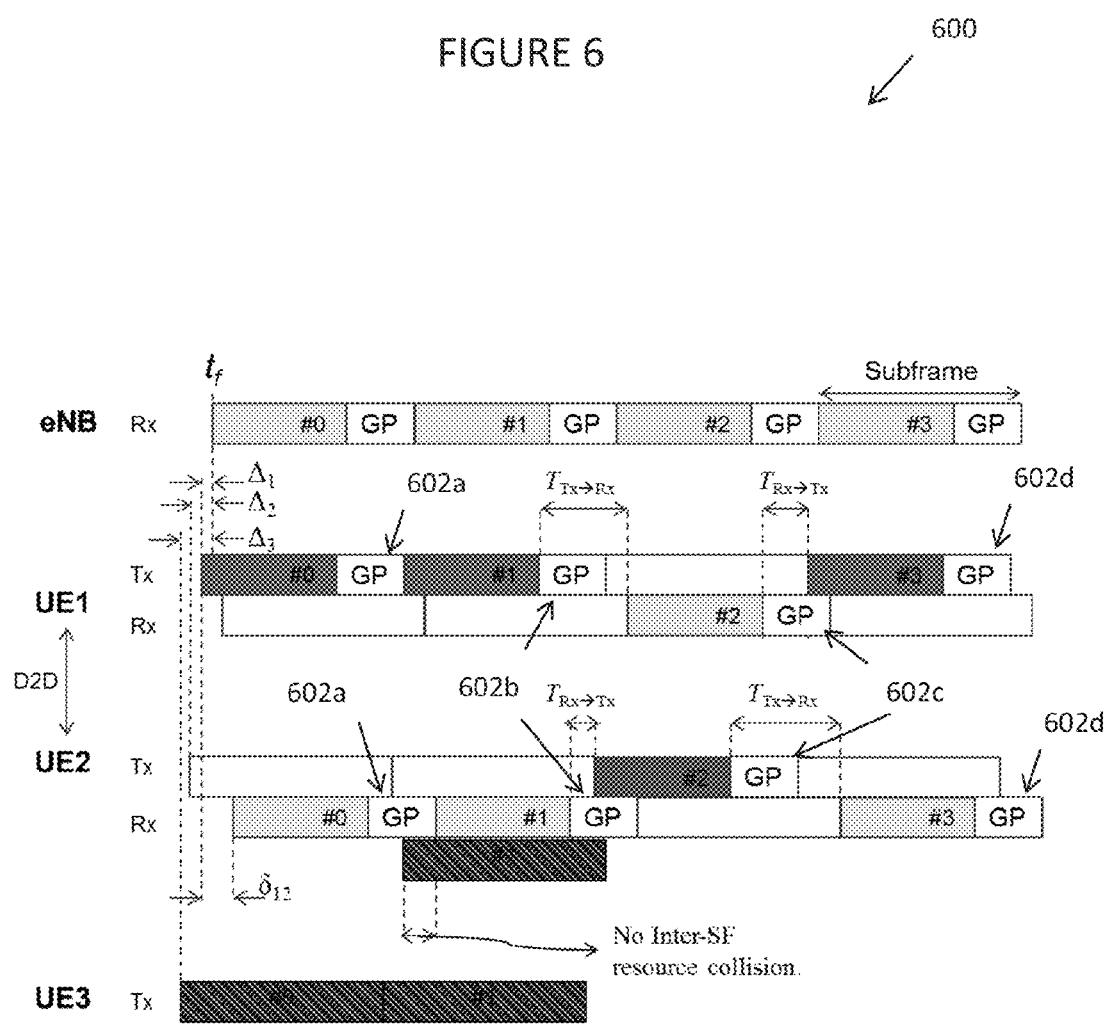
FIG. 6 is a schematic illustrating guard periods for IDS.

In regard to adding guard periods, the D2D transmitter may insert a guard period (GP) at the end of subframes when using UL resources. In addition, the D2D transmitter may insert a GP at the beginning of a subframe if the cyclic prefix (CP) length is not large enough to remove interference caused by an inter-subframe resource collision, which occurs when the interfering subframe is delayed relative to the desired subframe. In some instances, an SRS may override adding a GP to a subframe. For example, if the D2D transmitter is scheduled to transmit an SRS in a subframe, the D2D transmitter may omit the GP in that subframe. In these instances, if the D2D transmitter is scheduled to receive data in the next subframe after the SRS, the D2D transmitter may insert a GP at the beginning of the next subframe. If SRS is also used as a D2D reference signal and is received by the D2D receiver, the eNB may execute additional processes to eliminate or otherwise reduce interference on the SRS at the D2D receiver. In some examples, the eNB may avoid allocating resources used for the SRS in the current subframe to another UE in a subsequent subframe. In some examples, the eNB may request UEs whose transmission may potentially interfere with the SRS at the D2D receiver to avoid the first OFDM symbol in the subframe following the SRS subframe. FIG. 6 and the associated description provide additional details of these implementations.

Figure 7:
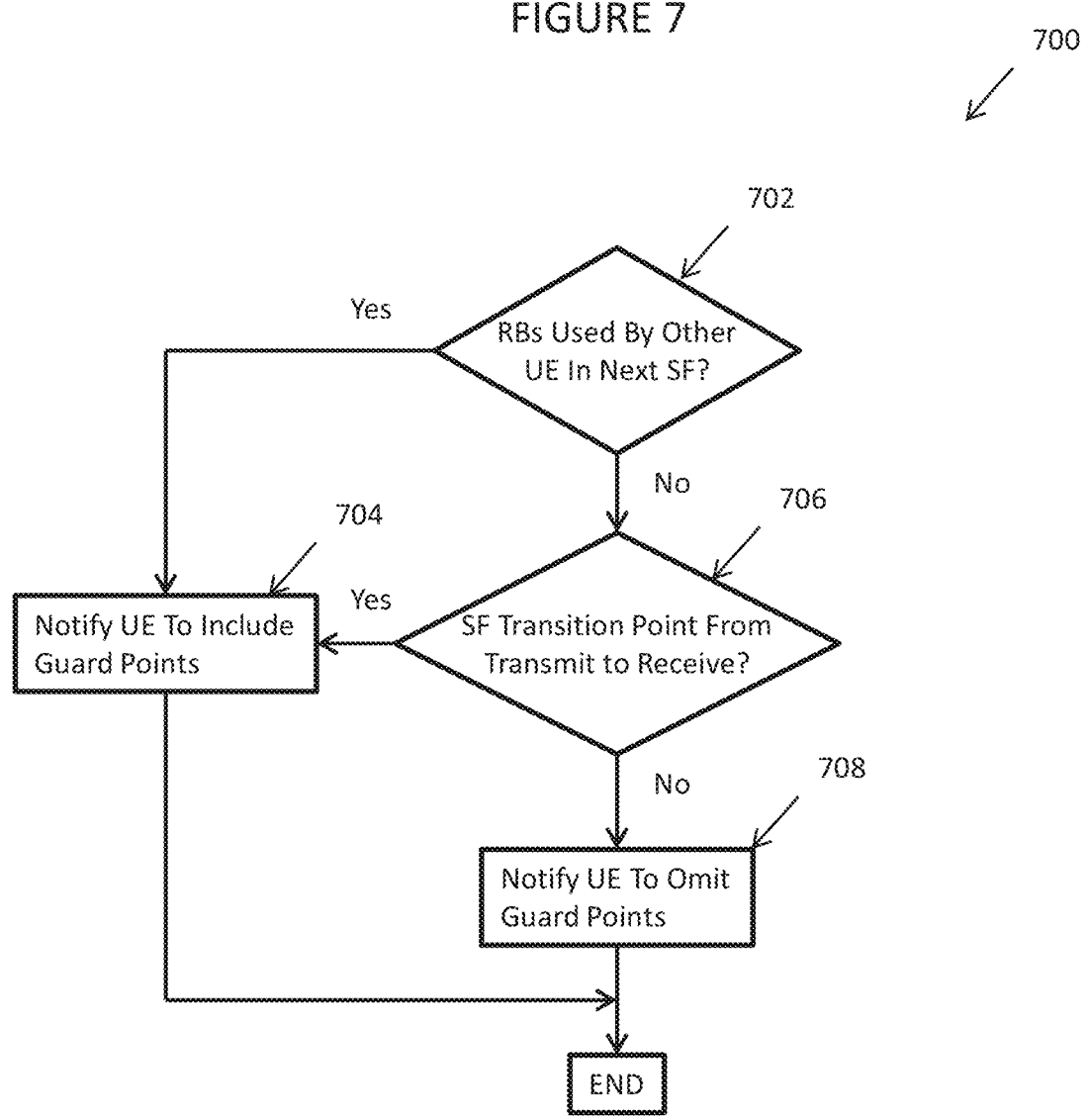
FIG. 7 is a flowchart illustrating an example method for determining whether to add guard periods to subframes.

In some implementations, the eNB may determine whether the D2D transmitter should include a guard period or not. When using UL resources, if a subframe is not subject to inter-subframe resource collision and if the direction of the D2D link does not change in the immediate next subframe, the eNB may request that the D2D transmitter omit a GP at the end of the subframe. In these instances, the eNB may include, in a D2D transmission allocation in the PDCCH, a field indicating whether or not to use a guard period for a subframe. If the eNB can avoid, for a certain period of time, allocating the same RBs in a SF for a D2D transmitter to another UE in the next SF, then the eNB may semi-statically transmit a no-guard-period signal to the D2D transmitter and receiver. In some implementations, the D2D transmitter may be implicitly signaled whether to include a GP in a current subframe. For example, the D2D transmitter may determine that the direction of the D2D link is not switching in the next subframe based on the resource allocations and, in response, omit a GP in the current subframe. In some implementations, the UEs may provide information to the eNB regarding other UEs, and the eNB may use this information to determine whether a GP should be included. For example, the UEs may measure reference signals (e.g., SRS) of other transmitting UEs. Based on the measured reference signals, the UEs may determine the signal strength as well as the timing and report them to the eNB. For upcoming D2D transmissions, the eNB may determine a subset of the UEs that may experience timing-misalignment interference, note their allocations, and send to the UEs appropriate commands whether to use guard periods. FIG. 7 and associated description provide additional details of these implementations.

Figure 8:
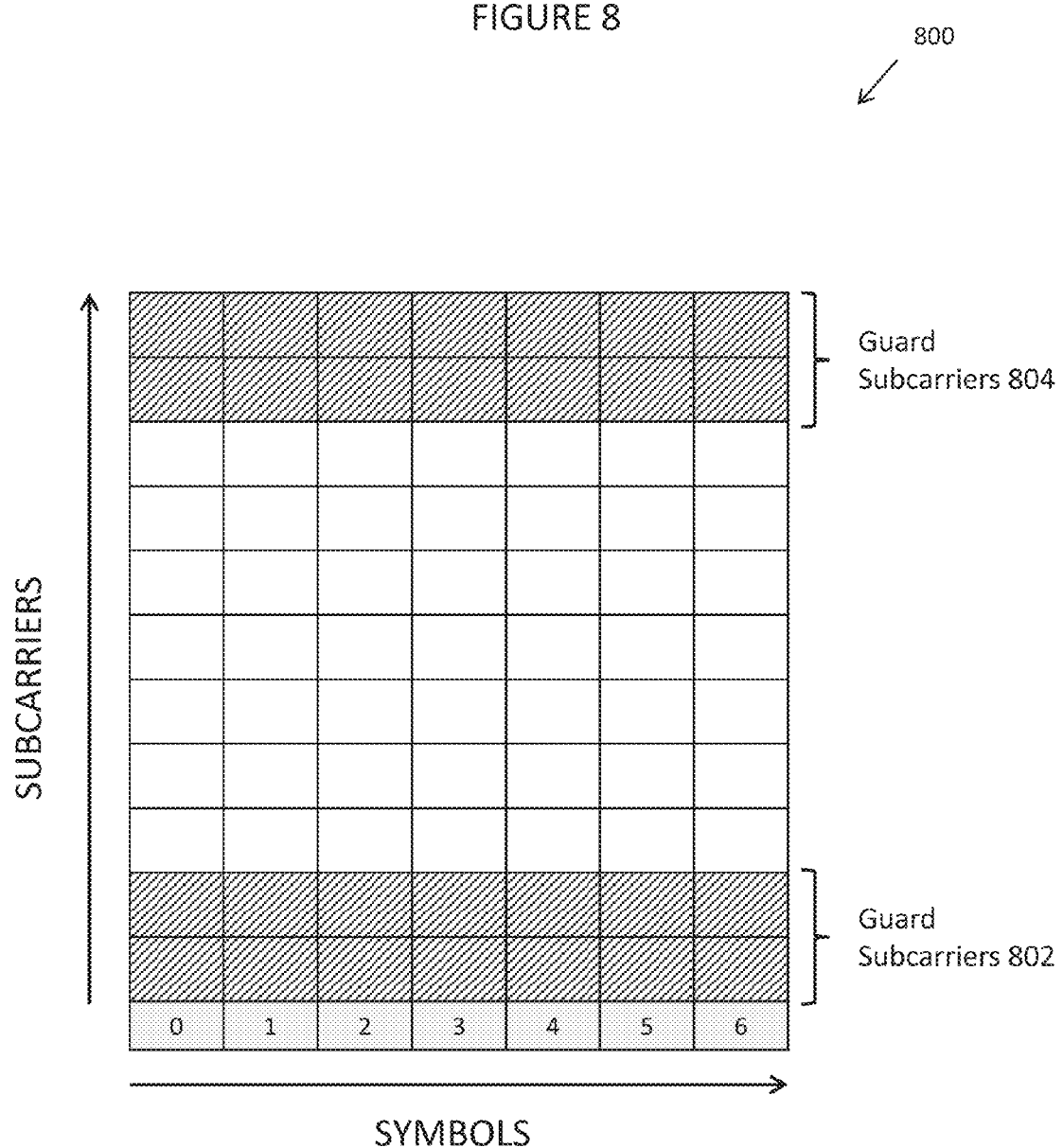
FIG. 8 is an example resource block including guard subcarriers.

In regard to adding guard subcarriers, the eNB may reserve one or more subcarriers as guard subcarriers at one or both sides of a physical resource block (PRB) group allocated for D2D link. In these instances, the D2D transmitter does not map data symbols to these guard subcarriers leaving them blank. The eNB may determine the number and configuration of the guard subcarriers. In these instances, the eNB may signal whether or not to use guard subcarriers through, for example, dynamic signaling, radio resource control (RRC) signaling, broadcast messages, or others. For non-contiguous resource allocation, the eNB may assign guard subcarriers to each group of contiguous PRBs. FIG. 8 and associated description provide additional details of these implementations.

In regard to avoiding the PDCCH for D2D links, the eNB may avoid allocating resources in PDCCH. When DL resources are used for D2D communications, the D2D link may interfere with the PDCCH being received by the D2D receiver. To reduce the interference, which may have detrimental effect on system performance on both UL and DL, the D2D transmitter may not transmit on the PDCCH region of the subframes. That is, the D2D transmitter may skip or otherwise omit the PDCCH resources when the resource mapping is done for the IDS. In doing so, the D2D receiver may be able to decode the PDCCH. Avoiding the PDCCH region may also eliminate, minimize, or otherwise reduce inter-SF resource collisions. In some implementations, the D2D transmitter can be notified of the size of the PDCCH region and omit transmissions in those symbols. In these instances, the eNB may transmit a signal to inform the D2D transmitter of the PDCCH region size. In addition, the D2D transmitter may add a guard period after the avoided PDCCH region when using DL resources. In doing so, the D2D transmitter may eliminate, minimize or otherwise reduce a D2D transmission interfering with a PDCCH region. Also, this blank region may provide a sufficient gap between transmit and receive windows at the D2D UEs.

Figure 1:
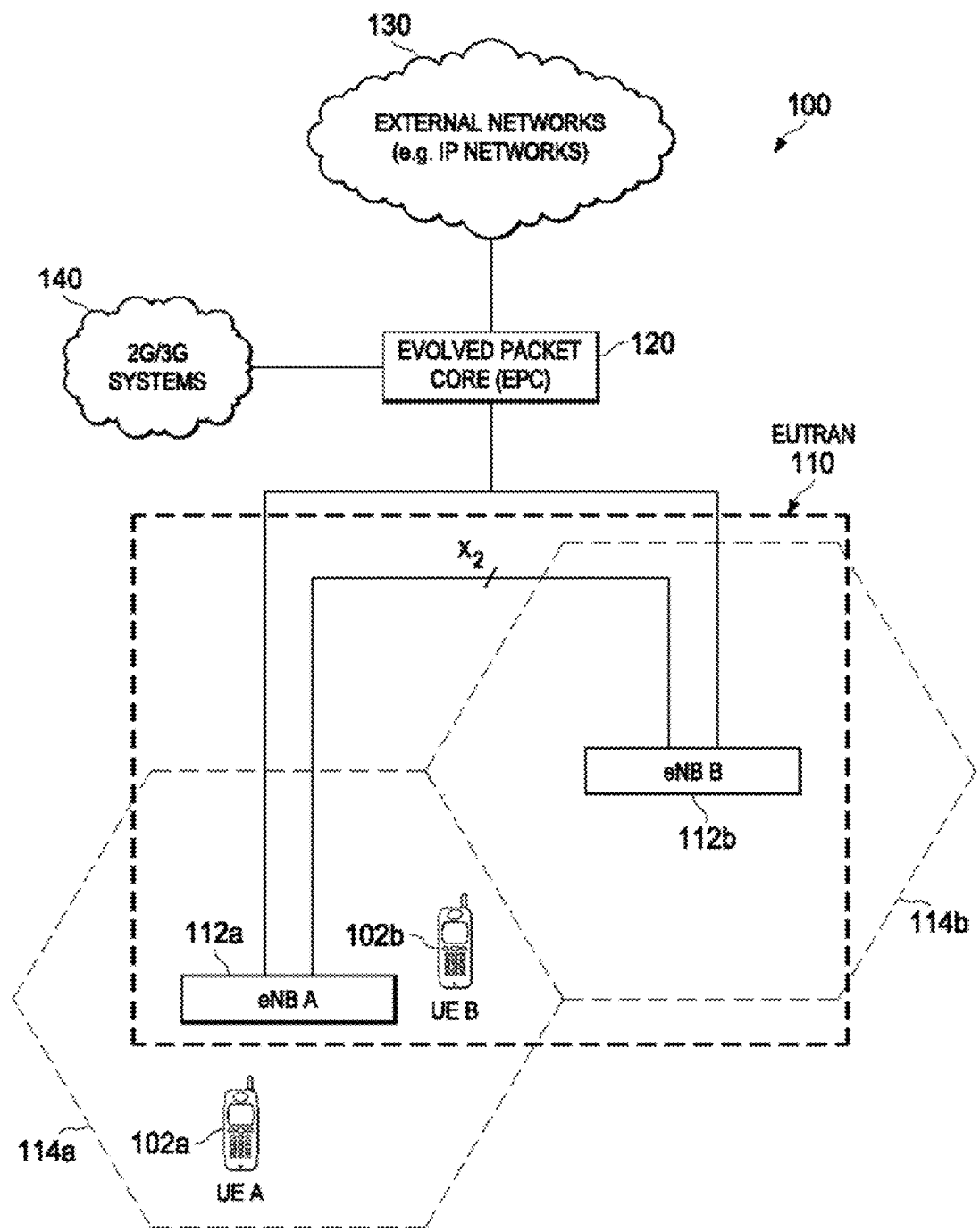
FIG. 1 is a schematic block diagram of an example mobile communication system.

FIG. 1 is a schematic block diagram of an example mobile communication system 100. The mobile communication system 100 shown in FIG. 1 may include one or more network nodes (e.g., 112*a* and 112*b*). The network nodes may take several forms in a mobile communication system, such as (but not limited to) an evolved Node B (eNB), a base station, a Node B, a wireless access point, a radio network controller, a base transceiver station, a layer two relay node, a layer three relay node, a femto cell, home eNB (HeNB), a home Node B (HNB), a base station controller, or other network node that includes radio resource control. In the LTE example of FIG. 1, the network nodes are eNBs 112*a* and 112*b*. The example mobile communication system 100 of FIG. 1 may include one or more radio access networks 110, core networks (CNs) 120, and external networks 130. In some implementations, the radio access networks 110 may be an evolved-UMTS terrestrial radio access networks (E-UTRAN). In addition, in certain instances, the core networks 120 may be evolved packet cores (EPCs). Further, there may be one or more mobile electronic devices 102*a*, 102*b* operating within the mobile communication system 100. In some implementations, 2G/3G systems 140 may be a Global System for Mobile communication (GSM), Interim Standard 95 (IS-95), Universal Mobile Telecommunications System (UMTS), or a CDMA2000 (Code Division Multiple Access) and also integrated into the mobile communication system 100.

As illustrated, the radio access network 110 includes eNB 112*a* and eNB 112*b*. Cell 114*a* is the service area of eNB 112*a*, and Cell 114*b* is the service area of eNB 112*b*. In this example, UEs 102*a* and 102*b* operate in Cell 114*a* and are served by eNB 112a. The UEs 102a and 102b may be any electronic device used by an end-user to communicate, for example, within the mobile communication system 100. The UEs 102a and 102b may transmit voice data, video data, user data, application data, multimedia data, text, web content and/or any other content.

The UE 102a or 102b may be referred to as mobile electronic device, user device, mobile station, subscriber station, portable electronic device, mobile communications device, wireless modem, or wireless terminal. Examples of a UE (e.g. UE 102a or 102b) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile communication system which implements a radio access technology, such as UMTS, CDMA2000 and 3GPP LTE. For example, the radio access network (RAN) 110 included in an LTE telecommunication system is called an EUTRAN. The EUTRAN can be located between the UEs and core network 120 (e.g. an evolved core network, EPC). The EUTRAN includes at least one eNB. The eNB can be a radio base station that may control all or at least some radio related functions in a fixed part of the system. The at least one eNB can provide radio interface within their coverage area or a cell for the UEs to communicate. The eNBs may be distributed throughout the cellular network to provide a wide area of coverage. The eNBs directly communicate with one or more UEs, other eNBs, and the core network.

Once the eNB 112a determines that an IDS connection between two or more UE 102a and 102b is appropriate, the eNB 112a may send IDS configuration information to the UE 102a and 102b to enable the inter-device session. IDS configuration information may include an SRS and allocated IDS PUCCH resources. As previously mentioned, the mobile communication system 100 may compensate for timing misalignment for subframes associated with the first UE 102a or the second UE 102 during an IDS. For example, the mobile communication system 100 may compensate for timing misalignment by adjusting the receive or transmit timing, adding guards (e.g., periods, subcarriers), avoiding allocation of IDS resources in the PUCCH, or others. As for adjusting transmit timing, the first UE 102a may adjust the transmit timing based on a propagation delay between the first UE 102a and the second UE 102b. In these instances, the second UE 102b may maintain the receive timing based on the propagation delay between the second UE 102b and the eNB 112a. As for adjusting the receive timing, the second UE 102a may adjust the receive timing based on a propagation delay between the first UE 102a and the second UE 102b. In these instances, the first UE 102b may maintain the transmit timing based on the propagation delay between the first UE 102a and the eNB 112a. As for guards, the UE 102a may add a guard period to at least one of the beginning or the end of the subframe. In these instances, the guard period may be added to the beginning of a subframe and equal or greater than the size of the PDCCH when using DL resources. In addition, the UE 102a may assign for one or more contiguous physical resource block (PRB) groups, guard subcarriers with at least one of subcarriers with the lowest indices in that PRB group or subcarriers with the highest indices in that PRB group.

As described previously, an IDS resource may use UL radio resources or DL radio resources. For time division duplex (TDD) implementations, the IDS resource allocation may include assignment of particular subframes. For frequency division duplex (FDD) implementations, the IDS resource allocation may include assignment of particular sub-band frequencies. In other implementations, the IDS resource allocation may include assignment of particular component carriers.

The eNBs 112a and 112b may be the end point of the radio protocols towards the UEs 102a, 102b and may relay signals between the radio connection and the connectivity towards the core network 120. In certain implementations, the EPC may be the main component of a core network 120. The core network 120 may include a backbone network, which may be a central part of the mobile communication system 100. The core network 120 may include other components, such as (but not limited to) a mobility management entity (MME), a serving gateway (SGW), and/or a packet data network gateway (PGW). The MME may be the main control element in the core network 120 responsible for the functionalities comprising the control plane functions related to subscriber and session management. The SGW can serve as a local mobility anchor, such that the packets are routed through this point for intra radio access network 110 (e.g. intra-EUTRAN) mobility and mobility with other legacy 2G/3G systems 140. The SGW functions may include the user plane tunnel management and switching. The PGW may provide connectivity to the services domain comprising external networks 130, such as the IP networks. The UEs 102a, 102b, radio access network 110 (e.g. EUTRAN), and core network 120 (e.g EPC) are sometimes referred to together as the evolved packet system (EPS).

For IDS, the eNB 112a may allocate a timing reference signal (RS) to the UE 102a and 102b for determining a propagation delay between the UE 102a and 102b. In some implementations, the eNB 112a may receive the IDS propagation delay and transmit information identifying the delay to the UE 102a or 102b or both. In addition, the eNB 112a may allocate UL or DL resources or both to the UE 102a and 102b for the IDS. In some implementations, the eNB 112a may signal or otherwise notify the UE 102a or 102b of one or more of the following: location of guard periods or subcarriers; PDCCH size; when to add guard periods or subcarriers; or other information. Though described in terms of FIG. 1, the present disclosure is not limited to an LTE environment.

As previously mentioned, FIGS. 2 and 3 are directed to adjusting the receive timing at the D2D receiver when using UL resources in an IDS. In particular, FIG. 2 illustrates an adjusted receive timing, and FIG. 3 illustrates a method for determining the adjustment to the receive timing. In regard to FIG. 2, schematic 200 illustrates eNB UL subframe timing 202, transmitter D2D subframe timing 204, and timing of received D2D subframes 206 at the D2D receiver. The eNB subframe timing 202 illustrates $t_f$ as the start of the subframe reception by the eNB. The transmitter subframe timing 204 illustrates $\Delta_1$ as the propagation delay between the transmitter and the eNB and $t_f - \Delta_1$ as the start of the transmission by the transmitter (for UL alignment). The receiver subframe timing 206 illustrates the propagation delay ($\delta$) between the transmitter and the receiver and the adjusted D2D receive timing ($t_f - \Delta_1 + \delta$). In short, when using UL resources, the transmitter maintains uplink alignment with the eNB ($t_f - \Delta_1$), and the receiver adjusts the timing of its receive window to $t_f - \Delta_1 + \delta$ using the time offset measured based on receiving a timing RS from the transmitter.

In regard to FIG. 3, method 300 begins at step 302 where the UEs are synchronized to the UL and DL subframes of the eNB. For example, the UE 102a and 102b in FIG. 1 may be synchronized with the UL and DL subframes of the eNB 112a. At step 304, a notice of resources allocated for a timing RS is received. In the example, the eNB may allocate to the UE 102a resources for a timing RS and communicate that assignment to both the transmitter (UE 102a) and the receiver (UE 102b). When determining the D2D timing offset, the UE 102a and 102b may use different timing reference symbols or different RS resources as discussed in more detail in paragraphs 0033-36. At step 305, the timing RS is transmitted to the receiver such that the timing of the transmission is aligned with UL transmissions to the eNB. Next, at step 306, the timing RS is received from the transmitter. Returning to the example, the UE 102a may be aligned to UL transmissions to the eNB and transmit the timing RS to the UE 102b in accordance with that alignment. At step 308, the receiver (UE 102b) measures the offset of the received RS relative to the UL timing of the receiver UE 102b. As both the UE 102a and 102b are using UL resources, the initial receive timing is based on the UL subframe timing so the measured offset is $\Delta_2 - \Delta_1 + \delta$. At step 310, the receive timing is adjusted based on the offset. As for the example, the receive timing for UL resources is $t_f - \Delta_2$ so the value of the adjusted receive timing is $(t_f - \Delta_2) + (\Delta_2 - \Delta_1 + \delta) = t_f - \Delta_1 + \Delta$.

To execute method 300, one or more of the following elements may be implemented: timing reference symbols; mechanism for signaling the timing RS resources; and mechanism for requesting timing RS by the D2D receiver. In regard to timing reference symbols, a sequence with ideal cyclic auto-correlation may be used as the timing reference symbol. One of the existing configurations, such as SRS, demodulation RS, or PRACH, may be used for this purpose or a new configuration, dedicated for D2D operation, may be defined. For the SRS, it may be used for measuring timing offset the same way as the SRS is used in UL alignment in LTE systems. Though, in configuring SRS resources, the eNB may assign a cyclic shift to a D2D link substantially different from a cyclic shift assigned to another transmitter UE (on the same time-frequency resources). Otherwise, an interfering SRS may arrive at the D2D receiver with higher power than the desired SRS, so the interfering SRS may cause ambiguity in measuring the timing offset. In some implementations, no other SRS is configured on the time-frequency resources that a D2D SRS is configured on. This avoidance may be an inefficient approach in terms of resource usage; however, to limit or otherwise reduce this resource inefficiency, a shorter-length SRS (e.g., subband SRS) may be used for D2D.

As for PRACH, it can be also used for timing measurement since preamble sequences are generated from cyclic shifts of root Zadoff-Chu sequences. PRACH may provide a more accurate timing estimation at the cost of using more resources. The preamble sequences used by D2D links (for the purpose of timing estimation) may be chosen from the set of preambles dedicated for contention-free access. The allocation of preamble sequences to D2D links may be carried out dynamically (using the PDCCH) or semi-statically (e.g., with RRC signaling). Since a demodulation (DM) RS uses dedicated time-frequency resources, the DM RS may be easier to configure for the purpose of timing estimation. In some instances, the DM RS may be sent only on the RBs that are allocated for data communication, so they may not collide with the RS of other UEs.

A hybrid solution including all or some of the mentioned configurations may be used to obtain the timing estimation. The configuration used may depend on the scenario and on the availability of the configurations. For example, at the initial synchronization, when the D2D receiver still does not have a good estimation of the timing of the arriving D2D subframe, PRACH may be used. Once the initial synchronization is established, if there is data to be transmitted, a DM RS may be available and may be used for fine tuning and tracking small changes in timing. If there is no data to be transmitted, the SRS may be used for timing adjustment.

In regard to timing RS resources, if SRS is used as the timing RS, each device may be configured to use certain time, frequency, and cyclic shift resources for SRS transmissions in the same way as for cellular UEs. This information may be signaled to the transmitter through an RRC message, but the D2D receiver may also be aware of the SRS configuration allocated to the D2D transmitter. In these instances, the RRC message carrying the SRS information for each device may include information about both the transmit SRS and the receive SRS for that device. Alternatively or in combination, the eNB may only assign a single SRS configuration for each D2D link, instead of for each device. In other words, from the eNB perspective, only one SRS configuration may be assigned, but the devices involved in the D2D link may share that SRS configuration by transmitting in every second SRS opportunity. How these SRS resources are shared by the two D2D UEs may be configured by eNB separately (e.g., through another RRC message) or may be autonomously decided by the devices. For example, each device may send the SRS on every second SRS opportunity allocated for the D2D link. If PRACH is used as the timing RS, it may be used in a contention-free manner, i.e., the PRACH preamble resource may be signaled to both the transmitter and the receiver.

In regard to requesting the timing RS by the D2D receiver and in addition to a regular timing RS, the receiver may request an extra timing RS as compared with a periodic SRS or a DM RS. This irregular timing RS may be requested by the D2D receiver. For example, this request may be sent via PUSCH or PUCCH. If there are dedicated resources for the timing RS for a specific D2D link and if there is a direct control channel between the two devices, then the request for the extra timing RS may be directly sent to the D2D transmitter.

As previously mentioned, FIGS. 4 and 5 are directed to adjusting the transmit timing at the D2D transmitter when using DL resources in an IDS. In particular, FIG. 4 illustrates an adjusted transmit timing, and FIG. 5 illustrates a method for determining the adjustment to the transmit timing. As illustrated in FIGS. 4 and 5, in order to align the D2D subframe with the DL subframe from the eNB when they arrive at the receiver UE of a D2D link, the transmission timing of the D2D transmitter may be adjusted based on the timing estimation at the transmitter UE or based on the timing estimation at the receiver UE.

In regard to FIG. 4, a schematic 400 illustrates eNB DL subframe timing 402, timing of DL subframe reception at the receiver 404, and timing of D2D subframe transmission at the transmitter 406. The eNB subframe timing 202 illustrates $t_f$ as the start of the DL subframe transmission by the eNB. The receiver subframe timing 204 illustrates $\Delta_1$ as the propagation delay between the receiver and the eNB, and $t_f + \Delta_1$ as the start of the receiver timing window at the receiver (for DL alignment). The transmitter subframe timing 206 illustrates the propagation delay ($\delta$) between the D2D transmitter and the receiver and the adjusted transmit timing ($t_f + \Delta_1 - \delta$). In short, when using DL resources, the receiver maintains downlink alignment with the eNB ($t_f + \Delta_1$), and the D2D transmitter adjusts its transmitter timing to $t_f + \Delta_1 - \delta$ using the time offset measured at the transmitter or at the receiver based on receiving a timing RS.

In regard to FIG. 5, method 500 illustrates transmit-timing adjustment based on a timing estimation at the transmitter. If the propagation delays (including the delays in RF front ends and other circuitries) in both directions of a D2D link are the same, the D2D transmitter may adjust the transmit timing by measuring the D2D timing offset between the receiver and the transmitter. In order to determine the measurement, the D2D receiver may send a timing RS to the D2D transmitter. When executing method 500, reciprocity of propagation delays in both directions of the D2D link may be assumed.

Method 500 begins at step 502 where the UEs are synchronized to the UL and DL subframes of the eNB. For example, the UE 102a and 102b in FIG. 1 may be synchronized with the UL and DL subframes of the eNB 112a. At step 504, a notice of resources allocated for a timing RS is received. In the example, the eNB may allocate to the UE 102a resources for a timing RS and communicate this allocation to both the receiver (UE 102a) and the transmitter (UE 102b). In some implementations, the UE 102a and 102b may use different timing reference symbols or different RS resources as discussed above in paragraphs 0033-36, respectively. At step 505, the timing RS is transmitted to the D2D transmitter such that the timing of the transmission is aligned with UL transmission to the eNB. Next, at step 506, the timing RS is received from the receiver. By comparison, the transmit timing adjustment may be based on a timing estimation at the receiver as discussed below in paragraphs 0051. Returning to the example, the UE 102a may be aligned to UL transmissions to the eNB and transmit a timing RS to the UE 102b. The difference between the receiving time of the eNB DL subframes at the transmitter and the received subframe carrying the timing RS is measured at step 508. As both the UE 102a and 102b are aligned with the eNB UL timing reference, the UE 102a (receiver) transmits the timing at $t_f - \Delta_1$, so the delay of the DL receive timing at the transmitter relative to the received timing RS is $\Delta_2 + \Delta_1 - \delta$. At step 510, the transmit timing is adjusted based on the measured timing offset. As for the example, the transmit timing for UL resources is $t_f - \Delta_2$ so the value of the adjusted receive timing is $(t_f - \Delta_2) + (\Delta_2 + \Delta_1 - \delta) = t_f + \Delta_1 - \delta$.

In some implementations, the resources used for the timing RS may be DL resources. In some implementations, timing resources may be chosen from system UL resources. In either implementations, the transmission timing of timing RS may be aligned with the time advanced UL subframe of the receiver UE (step 506).

In some implementations, the UE1 may be the D2D receiver and the UE2 may be the D2D transmitter. As previously labeled, $\Delta_i$ may be the propagation delay of UE #i to the eNB and $\delta$ may be the propagation delay between UE1 and UE2. Also, $\Delta_{offset}$ may be the offset between UL and DL subframes at the eNB. In some implementations, $\Delta_{offset} = 0$ for frame structure type 1 (FDD), and $\Delta_{offset} \approx 20.3$ µsec for frame structure type 2 (TDD). If the starting of the DL SF at the eNB is the time reference, i.e., t=0 is the time that eNB starts sending the DL SF, the subframe carrying the timing RS starts at time $-\Delta_1 - \Delta_{offset}$. The UE2 may receive the subframe starting at time $-\Delta_1 - \Delta_{offset} + \delta$. Because the DL SF arrives at UE2 at time $\Delta_2$, the measured relative delay may equal $\Delta_2 + \Delta_1 + \Delta_{offset} - \delta$. Delaying UE2's UL SF, which starts at $-\Delta_2 - \Delta_{offset}$, by the measurement may lead to the D2D SF of UE2 to start at $\Delta_1 - \delta$. A D2D SF transmitted at time $\Delta_1 - \delta$ from UE2 may arrives at UE1 at time $\Delta_1$, i.e., aligned with the DL SF from the eNB.

Method 500 may only provide a solution for transmissions between UE2 and UE1, i.e., a solution to enable timing alignment between the transmitter and the receiver of the D2D link. Though, other D2D links may use the same SF (but on different RBs). In these instances, the interfering SFs may not be perfectly aligned to the receiver FFT window and interference in the form of ICI may occur. Implementing guard periods as illustrated in FIG. 6 may reduce this type of interference.

In some implementations, the transmitter may use the received timing RS in a different way than method 500. For example, the transmitter UE may measure the delay of its own UL SF relative to the received subframe carrying the timing RS. Subsequently, the D2D SF timing may be adjusted such that it is delayed relative to the DL SF of the transmitter UE by the measured amount.

In method 500, the subframe carrying the timing RS may not be aligned with the subframe carrying data. In these instances, the timing RS cannot be incorporated in the same subframe that carries data, so the timing RS may be sent in a different SF than data. While method 500 is appropriate for initial timing adjustment, a different method may be used for ongoing tracking of timing changes. In regard to UE1, the subframe carrying the timing RS starts at time $-\Delta_1 - \Delta_{offset}$, and the SF carrying data starts at time $\Delta_2 - \delta$. The time difference between these two types of subframes is $\Delta_1 + \Delta_2 + \Delta_{offset} - \delta$. In these instances, the following two issues may arise: (1) the timing RS SF does not arrive aligned with the DL SF at the other D2D UE causing the PDCCH and the timing RS to interfere with each other at UE2; and (2) little or no time may be left for switching between transmit and receive subframes at each of the D2D UEs. To address these issues, a large guard period may be added to the beginning of the timing RS SF to prevent or otherwise reduce interference with PDCCH at the UE2 and to provide sufficient time for Tx-Rx switching. These two issues may be more severe for frame structure type 2, where $\Delta_{offset}$ is nonzero and the time difference between SF carrying timing RS and SF carrying data is larger. This procedure, in its presented form, may be more appropriate for FDD.

When executing the process described above, method 500 may include one or more of the following design elements: periodic, aperiodic, or a combination of both transmission of the timing RS; signaling for requesting the timing RS; transmission of the timing RS SF offset by a predetermined value known to both D2D UEs; and a floating timing RS structure. In regard to periodic or aperiodic transmissions, the transmission of the timing RS may be periodic or aperiodic or a combination of both. In periodic configuration, the resources used for the timing RS of a D2D link may be signaled to both UEs (e.g., by RRC signaling). D2D UEs may continue to use this configuration until a new configuration is signaled to them. In an aperiodic scenario, transmission of the timing RS may be triggered by a command from the eNB sent, for example, through RRC signaling or as a MAC control element. The resources used for the timing RS may accompany the timing RS transmission command or may be pre-allocated through RRC signaling.

In regard to requesting the timing RS, signaling may be defined such that a receiver UE can request an opportunity for sending the timing RS and can request the transmitter UE to readjust its SF timing. This request may be sent to the eNB, and, in response, the eNB may act based on the aperiodic configuration. If the resources are already reserved for the timing RS of this link, a notification for a new timing RS may be sent from the receiver UE directly to the transmitter UE.

In regard to a predetermined offset value, the transmission of the timing RS SF may be offset by a predetermined value known to both D2D UEs. For example, in the case of frame-structure type 2, where $\Delta_{offset} \approx 20.3$ μsec, the transmission may be delayed by $\Delta_{offset}$. This way, without a GP or with a small GP, enough time is provided for Tx-Rx switching and also there is no or reduced interference on the PDCCH. The transmitter may take into account the constant offset in adjusting its transmission timing.

In regard to a floating timing RS structure, it may enable multiplex data and the timing RS in the same subframe, when the UE1 also has some data to be sent to UE2. As previously mentioned, the problem with multiplexing data and timing RS in the same subframe comes from the fact that the timing of the timing RS SF is different from the timing of the D2D subframe. The idea of a floating timing RS is that more time resources than what is actually needed is considered for the timing RS. For example, if one OFDM symbol is needed for the timing RS, two OFDM symbols may be reserved for this purpose. Transmissions from the UE sending the timing RS may be defined based on a single timing (the one that makes the D2D SF aligned with DL SF at the other UE). However, the exact starting time of the timing RS, within those two OFDM symbols, may be chosen such that the time difference from the starting of the UL SF may be equal to a predefined number of complete OFDM symbols. In doing so, the location of the timing RS may be floated in the reserved timing resources and changed as the UL SF timing changes or as the distance between the two UEs changes. Though, the timing of the RS may always be fixed relative to the UL SF of the transmitter. Since the timing variations depend on the distances between eNB and the two UEs and also on the distance between the two UEs, the timing fluctuations of the timing RS may be in the order of a few micro seconds. In these instances, one additional OFDM symbol may be sufficient to implement the floating timing RS structure. Using this implementation, the SF carrying the timing RS may also carry data, making resource usage more efficient.

As previously mentioned, the transmit timing adjustment may be based on the timing estimation at the receiver. In these implementations, the transmitter UE may send the timing RS. The receiver measures the time misalignment and issues a timing advance command to the transmitter. Based on the timing advance command, the transmitter adjusts the timing of the next transmission. To convey the timing advance command from the receiver to the transmitter, the receiver may convey the information using one of the following: directly sending a command from the receiver to the transmitter on a control channel defined for the D2D link; sending the command from receiver to the eNB (on PUCCH) and then from eNB to the transmitter (on PDCCH); or other signaling. By conveying the timing advance through the eNB, one of the existing PUCCH formats can be reused depending on how many bits are used to transmit the timing advance command.

In these implementations, new signaling may be defined to allow the receiver to request a timing RS in case the transmission from the transmitter is out of sync. For example, the request may be sent to the transmitter UE directly via a D2D direct control channel or by sending the request via eNB. In the latter case, an existing PUCCH format may be used for the request to be sent to the eNB and some DCI formats may be modified for the request to be sent from eNB to the transmitter UE.

Due to the feedback for a timing advance command, estimating the timing advance at the receiver may incur some overhead compared to estimating the timing advance at the transmitter. Estimating the timing advance at the receiver may be used for both initial timing estimation and tracking the timing changes. Also, data and the timing RS may be multiplexed in the same SF without requiring an additional GP.

Estimating the timing advance at the receiver and estimating the timing advance at the transmitter typically assumes that the transmitter is transmitting data to only one receiver. Though, in some implementations, the transmission may be intended for multiple receivers. In these instances, transmitter may not be able to adjust the transmission timing such that the D2D SF is aligned with the DL SF from the eNB at all receivers. In this case, the transmitter UE may adjust the transmission timing according to only one of the receiver. In some implementations, the eNB configures only one receiver to transmit the timing RS for timing measurement at the transmitter or configures only one receiver to measure the timing of the transmitter and report to the eNB. In some implementations, if the timing advance is estimated at the transmitter, the transmitter may measure the timing to each of the receivers and, based on some implementations, choose one of the measured relative delays or a combination of them to adjust the transmit timing. If only one of the relative delays is chosen, the corresponding receiver may have the same performance as in the case of one-to-one link, but the other receivers may experience some performance degradation. If a combination of all relative delays is properly chosen, the performance degradation at all receivers may be alleviated or otherwise reduced. If the timing advance is measured at the receiver, the eNB may collect the measured time misalignments from each of the receivers and, based on some implementations, signal to the transmitter a single timing-advance value. In both implementations, for one or more UEs, the D2D SF may not be perfectly aligned with the eNB DL SF. Though, adding guard periods after the PDCCH as discussed with respect to FIG. 6 or avoid transmission in the PDCCH as discussed with respect to FIG. 9 combined with a CP may enable these devices to successfully decode the D2D link as well as the PDCCH.

FIG. 6 is a schematic 600 illustrating subframes including guard periods 602a-d for IDS. In particular, the guard periods 602a-d may be added at the end of the subframes when using UL resources because they may prevent inter-UE interference caused by inter-subframe resource collision. As illustrated, when SF#1 transmitted by UE3 is received at UE2, the UE2 may have already finished receiving the useful part of SF#0. Thus, even if the same resource is used for SF#0 transmitted by UE1 (for UE2) and SF#1 transmitted by UE3, no resource collision may occur at UE2. In addition, the inserted GP may provide sufficient time to switch between Tx-Rx subframes. The GP length may be one or multiple OFDM symbols.

While adding a GP at the beginning of the subframe may provide sufficient time to switch between Tx-Rx subframes, a GP may still be needed at the end of the subframe to avoid inter-subframe resource collision. In these instances, a single GP at the end of the subframe may be more efficient. In some implementations, adding a GP at the beginning of the subframe prevents inter-subframe resource collision in cases where the interfering SF is time advanced relative to the desired SF. If the interfering SF is delayed relative to the desired SF, a CP may be sufficient to remove or otherwise reduce the interference. If the delay is larger than the CP length, an additional GP may be inserted at the beginning of the subframe. The insertion of an additional GP at the beginning of the SF may be signaled from the eNB to the D2D UEs.

In some implementations, a conflict between a GP and an SRS may occur. In LTE, UEs may occasionally (periodically or aperiodically) transmit an SRS in the last symbol of a subframe, which is typically used by the eNB to measure and control the timing of the UEs or to monitor the UL channel quality (e.g., for frequency selective scheduling). In a D2D scenario, the existing SRS may also be used by D2D UEs for the same purposes. If a UE is requested to transmit the SRS in a subframe and because the SRS is transmitted in the last symbol of a subframe, a conflict occurs between the SRS transmission and the GP. In this case, the SRS transmission may override the GP. If the subframe in which SRS is transmitted is followed by a D2D subframe in which the same UE should receive data, then the timing between the Tx-RX subframes may not be sufficient. As a remedy, the D2D device sending in the next subframe may insert a GP in the beginning of the subframe. In some implementations, the insertion of an additional GP at the beginning of the SF may be signaled from the eNB to the D2D UEs. In some implementations, the receiver may be able to decode the control information sent to the transmitting UE by the eNB, including the SRS configuration, and hence may be aware of the SF in which SRS is transmitted.

As for the inter-UE interference caused by an inter-subframe resource collision, the following two scenarios may be considered separately: (1) the SRS is aimed for the eNB only (and not for another D2D UE); or (2) the SRS is sent for a D2D UE (e.g., for timing estimation purposes). In regard to the SRS aimed for the eNB, because no UE is expecting the SRS, as in the case of GP insertion and no SRS transmission, the UEs may ignore the OFDM symbol carrying SRS. In these instances, the SRS transmission may not cause inter-subframe resource collision. In regard to the SRS to a D2D UE, inter-subframe resource collision may occur. In these instances, the eNB scheduler may avoid allocating the resources used for the SRS (by D2D UEs that transmit SRS for other D2D UEs) in the current subframe to another UE in a subsequent subframe. In some implementations, the eNB may request UEs whose transmission may potentially interfere with the transmitted SRS to avoid the first OFDM symbol in the subframe following the SRS subframe. This type of resource mapping may not be defined for legacy UEs, so it may be applied for new UEs (like D2D UEs). For legacy UEs, their transmission may be controlled by the scheduler as mentioned above. Skipping the first OFDM symbol after the SRS may be implemented in different ways. In some implementations, if the non-legacy UEs know the subframes at which the SRS may be transmitted (e.g., through RRC signaling), the non-legacy UEs may skip the first OFDM symbol of the subsequent subframe. In these instances, the transmitter (D2D transmitters or UEs transmitting to an eNB) may not map their data to the first OFDM symbol. Also, the receiver may not evaluate the first OFDM symbol for detecting data. In some implementations, a single bit, instructing a UE to skip the first OFDM symbol, may be signaled along with D2D resource allocation or UL resource allocation to the transmitter that may cause interference to the SRS in the preceding SF. In the case of scheduling a D2D link in the SF after the SRS, both the transmitter and the receiver may be instructed to skip the first OFDM symbol.

FIG. 7 is a flowchart illustrating an example method 700 for determining when to add guard periods to subframes. As previously discussed, inserting a GP at the beginning or at the end of every subframe may alleviate timing misalignment issues in D2D operation. Though, leaving part of every subframe blank reduces available resources. To reduce the inefficiency inherent in inserting GPs, method 700 determines whether a D2D SF needs a GP. Method 700 begins at decisional step 702. If the RBs used by the D2D transmitter in the current SF are used by another UE in the next SF, then, at step 704, the eNB instructs the D2D transmitter to insert a GP at the end of the subframe. Returning to decisional step 702, if the RBs used by the D2D transmitter in the current SF are not used by another UE in the next SF, execution proceeds to decisional step 706. If the next SF is used for the opposite direction of the same D2D link, then, at step 704, the eNB instructs the D2D transmitter to insert a GP at the end of the subframe. If the SF is not at transition point from transmit to receive or vice versa, then, at step 708, the eNB instructs the D2D transmitter to omit a GP in that subframe. In other words, the transmission is carried out in a usual LTE SF, i.e., without leaving any part of the SF blank as a GP.

The D2D UEs may be aware whether decisional step 706 is satisfied. Though, usually, only the eNB scheduler is aware of whether decisional step 704 is satisfied. If the current SF is not used by other UEs and is not a transition point, the eNB sends a no-guard-period signal to the D2D UEs, indicating that the SF to be transmitted/received includes no GP and all available REs are filled with data modulation symbols. Method 700 is a dynamic approach to implementing the as-per-need-GP idea and includes some overhead on the PDCCH. The no-guard-period signal may be part of the DCI that carries the D2D allocation. In the case of the SPS, this information may also be signaled semi-statically, either on the PDCCH or as an RRC signaling.

Other scenarios may be implemented to inform the UEs of no-GP-subframes semi-statically without departing from the scope of the disclosure. For example, the same UL resources may be used across a contiguous group of subframes for D2D operation between a given pair of UEs and also semi-persistent scheduling may be deployed by the eNB at least for the potential interferer or for the potential interference victim. In these instances, if the resources used at a subframe of a D2D link are different from the resources used at the next subframe of another transmitter, inter-subframe resource collision may not occur. Though, a GP may be inserted only at the transition point from transmit to receive or vice versa and also at the last subframe of the group of subframes for which the allocated resources do not vary.

In some implementations, the UE may assist in guard period determinations. In the solutions above, the UE is typically not involved in determining whether a GP is added to a specific scheduled SF. In some implementations, the UEs measure reference signals transmitted by other UEs (e.g., the SRS in the case of using UL resources or any reference signal that is used as the timing RS or proximity detection RS, in general). These other UEs may include D2D transmitters or regular cellular UEs. Based on these measurements, the UEs may determine the signal strength as well as the timing of the reference signals and report back to the eNB. Based on the timing information and/or the proximity information received from UEs, for each upcoming D2D transmission, the eNB may determine the subset of the UEs that may be impacted, note their allocations, and assign them a SF with or without a GP. In some implementations, the eNB may provide a timing correction to the transmitting UE depending upon the other UEs transmitting in the SF and the receiving UEs. In some implementations, the eNB may indicate a different power level for a UE transmitter depending upon the other UEs transmitting in the SF and the receiving UEs.

To implement the guard-period implementations, a no-guard-period signal may be defined for the D2D UEs. Also, the resources on which the UE may monitor the RS from other UEs may be included as part of the resource grant of the UE.

FIG. 8 is a PRB 800 including guard subcarriers 802 and 804. Inter-UE interference caused by ICI may be eliminated or reduced by ensuring that the PRB allocation for each D2D link is far enough from the PRB allocation of other D2D links or from the PRB allocation of conventional UEs. Though, in high traffic scenario, implementing this additional signaling may impose significant restriction on the scheduler or may even be impossible.

Reserving a few subcarriers as guard subcarriers on the boundary of a PRB group allocated for D2D link may reduce the ICI level on or from D2D links. As illustrated, the PRB 800 includes guard subcarriers 802 at the lower edge and guard subcarriers 804 at the upper edge of the allocated spectrum. While a single PRB is illustrated, guard subcarriers may be added to the upper and lower edge of contiguous PRBs. In these implementations, a group of contiguous PRBs allocated to the D2D link may include guard subcarriers with the lowest indices in the PRBs with the lowest index, or with highest indices in the PRBs with the highest index, or both. For example, if PRBs 4, 5, 6, and 7 are allocated for D2D and 2 subcarriers are considered as guard subcarriers on each side of the allocated frequency region, then subcarriers 0,1 of PRB 4 and also subcarriers 11,12 of PRB 7 may be reserved as guard subcarriers. In these implementations, when the transmitter maps data symbols to subcarriers, it may skip or otherwise avoid the guard subcarriers and leave them blank. Also, the receiver may be aware of the guard subcarriers for proper decoding of data.

As previously mentioned, the guard subcarriers may be inserted at both sides of the allocated RBG. In these instances, single-bit signaling may notify the D2D UEs of the presence or non-presence of guard subcarriers. In some implementations, the guard subcarriers for each side of the allocated RBG may be configured separately. The separate configuration may enable the eNB to configure guard subcarriers only at one side of the allocated RBG based on other scheduling information and recognizing that guard subcarriers are not needed at the other side. In this case, 2-bit signaling may configure the guard subcarriers. The configuration of guard subcarriers may be dynamically signaled to the UEs along with the resource allocation or semi-statically (e.g., through RRC signaling). This information may also be cell-specifically broadcast to D2D UEs in a cell.

In some implementations, the number of guard subcarriers may be predetermined in the specification. In alternative implementations, the number of guard subcarriers may be configured by the eNB and signaled to the UEs either dynamically, semi-statically, or through a broadcast message. When eNB configures the number of guard subcarriers, the maximum number of such subcarriers may be set in the specification.

For non-contiguous resource allocation, each group of contiguous PRBs may have guard subcarriers on each side. In these instances, the configuration of guard subcarriers may be done separately for each group of contiguous PRBs or may be done for the whole allocation together. In the former case, for each group of contiguous PRBs, a separate configuration may be signaled to the UE; whereas, in the latter case, a single configuration may be sent to the UE, which may be used for all of the contiguous PRBs.

Figure 9:
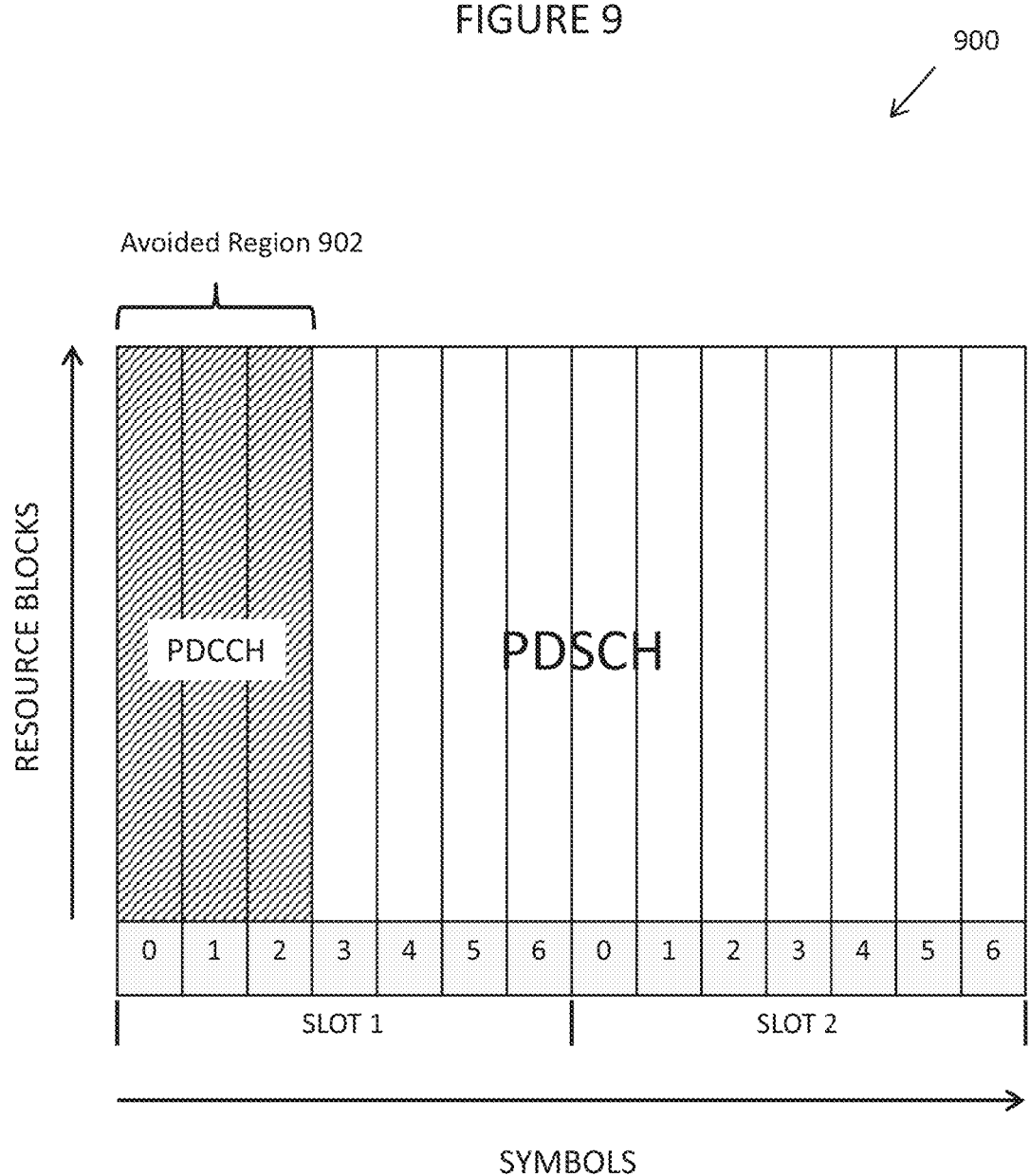
FIG. 9 is a schematic illustrating avoiding a PDCCH region for D2D transmissions.

FIG. 9 illustrates a portion of a subframe 900 including an avoided region 902. As illustrated, the avoided region is equal to or greater than the size of the PDCCH region so D2D transmissions avoid the PDCCH region. When DL resources are used for D2D communications, the PDCCH may experience interference from D2D links. To avoid or reduce the interference, which could have detrimental effect on system performance on both UL and DL transmissions, D2D transmissions may avoid the PDCCH region of the subframes. That is, the PDCCH resources may be skipped or otherwise avoided when the resource mapping is done for the D2D transmissions. In doing so, inter-SF resource collision also may be eliminated, minimized or otherwise reduced.

In some implementations, each assignment of D2D resources in DL resources may include the starting OFDM symbol of the PDSCH region, the starting OFDM symbol of the D2D resource allocation, or the PDCCH-region size. This resource assignment restriction may be used so that the D2D transmitter avoids the PDCCH region specified for the subframe(s) during the D2D assignment. This indication may be sent per assignment so that the UE is informed of the PDCCH size for a given subframe resource allocation.

In some implementations, the D2D resource assignment may not explicitly indicate the start OFDM symbol or PDCCH region size in each resource assignment. To realize the PDCCH-region avoidance, the number of OFDM symbols dedicated to the PDCCH may be known by the D2D transmitter. For example, the PDCCH-region size may be broadcast by the eNB or included in an RRC message to a D2D transmitter, allowing the size to change only semi-statically. In some implementations, the size of the PDCCH region for a given subframe may be indicated in a D2D allocation or otherwise configured for the D2D session or D2D-session subframes. For example, the eNB may indicate the configuration for the PDCCH size for certain subframes where D2D (proximity or direct device-to-device) potentially may occur. In other words, the eNB may indicate the maximum size of the PDCCH-region for certain subframes (e.g., determined by a periodic pattern). This maximum size may be determined a priori, i.e., well before scheduling any UE within the SFs. At the start of the D2D session, the maximum size of the PDCCH region may be signaled to D2D UEs, and the eNB may schedule these D2D UEs only in those certain SFs for which the maximum size of PDCCH region is a priori known. The predetermined size of the PDCCH region may be signaled via RRC messaging or in a new session information block (SIB) to the D2D UEs. In some implementations, the D2D allocations may be configured assuming the maximum value of the number of OFDM symbols allowed for the given band configuration. In these cases, the maximum size of the PDCCH region may be fixed according to predefined standards and may also be known to the scheduler that is allocating resources to the D2D transmitter. For example, a centralized scheduler in the eNB may be able to avoid assigning D2D resources within the symbols reserved for PDCCH.

In addition to the PDCCH-region avoidance, when DL resources are used for D2D communication, the D2D receiver may also be able to decode the PDCCH. The UEs may acquire synchronization to DL subframe using the existing mechanism in LTE based on PSS/SSS, so the transmitter UE may adjust its transmission timing such that the D2D subframe and the DL subframe are time-aligned at the receiver. In these instances, the D2D subframe and the eNB DL subframe may arrive at the receiver almost at the same time. The two solutions mentioned above may ensure that PDCCH detection across the UEs in a cell is not impacted by D2D communication over DL resources if the timing of the D2D transmission is aligned with eNB transmission at the receiver.

When using DL resources, the transmitter should avoid transmitting in symbols that correspond to the PDCCH region of the DL subframe and may add a guard period after the symbols that correspond to the PDCCH region of the DL subframe. Similar to the case of using UL resources, a GP may be inserted when using DL resources to solve or reduce interference on PDCCH region. In these instances, the GP may be added after the region 902 including the PDCCH. In doing so, if the SF of an interfering D2D transmitter arrives at another UE a bit earlier than the DL SF from eNB, then the GP may prevent or otherwise reduce interference imposed on PDCCH.

If the interfering SF is delayed relative to the DL SF, then the CP may handle the interference. Though, if the time misalignments are large, a GP may also be added at the end of the D2D SF to ensure that the end of a D2D SF does not interfere with the beginning of PDCCH region in the next SF.

A number of embodiments of the invention have been described. Nevertheless, it will be understood that various modifications may be made without departing from the spirit and scope of the invention. Accordingly, other embodiments are within the scope of the following claims.

For example, a method includes receiving, from the eNB, by a first UE, information identifying a size of a physical downlink control channel (PDCCH) for a subsequent subframe. A guard period is added, by the first UE, in the beginning of a subframe used for direct UE-to-UE communication to a second UE, the guard period being equal to or greater than the size of the PDDCH for the subsequent subframe.

What is claimed is:

1. A method, comprising:
compensating for timing misalignment of subframes associated with at least one of a first user equipment (UE) or a second UE, wherein the first UE and the second UE are in direct UE-to-UE communication, and a timing for the first UE and a timing for the second UE are derived from an eNode B (eNB); and
transmitting, by the first UE, subframes including guard periods, wherein each guard period is at least one of one or more contiguous symbols at a beginning of a subframe or one or more contiguous symbols at an end of a subframe.

2. The method of claim 1, wherein compensating for timing misalignment comprises compensating for a timing offset between the timing of the first UE and the timing of the second UE.

3. The method of claim 2, wherein compensating for a timing offset comprises adjusting a transmit time.

4. The method of claim 3, further comprising:
receiving, from the first UE, a timing reference signal (RS);
measuring, by the second UE, the timing offset between the first UE and the second UE; and
adjusting, by the second UE, the transmit time of the second UE using the timing offset.

5. The method of claim 4, wherein resources used for the timing RS are signaled, by the eNB, to the first UE and the second UE.

6. The method of claim 3, further comprising:
transmitting, by the second UE, a timing RS;
receiving, from the first UE, the timing offset between the first UE and the second UE; and
adjusting, by the second UE, the transmit time of the second UE using the timing offset.

7. The method of claim 6, wherein resources used for the timing RS are signaled, by the eNB, to the first UE and the second UE.

8. The method of claim 1, further comprising:
determining one or more contiguous physical resource block (PRB) groups allocated to the IDS; and
for each group of contiguous PRBs, allocating, as guard subcarriers, at least one of subcarriers with lowest indices in said each PRB group or subcarriers with highest indices in said each PRB group.

9. The method of claim 2, wherein compensating for timing offset comprises adjusting a receive timing.

10. The method of claim 9, further comprising:
receiving, from the first UE, a timing RS; and
adjusting, by the second UE, the receive timing for the second UE.

11. The method of claim 10, wherein resources used for the timing RS are signaled, by the eNB, to the first UE and the second UE.

12. The method of claim 1 wherein a guard period is one or more contiguous symbols at an end of a subframe, and the method further comprises: determining a sounding reference signal (SRS) is being transmitted in the subframe; and transmitting the SRS in the last symbol of the subframe, wherein transmitting the SRS overrides the last symbol of the guard period.

13. The method of claim 12, further comprising adding a guard period at a beginning of a subframe following the subframe including the SRS.

14. The method of claim 1, further comprising:
receiving, from the eNB, by the first UE, information identifying a size of a physical downlink control channel (PDCCH) for a subsequent subframe; and
adding, by the first UE, a guard period in a beginning of a subframe used for direct UE-to-UE communication to the second UE, the guard period being equal to or greater than the size of the PDDCH for the subsequent subframe.

15. A second UE, comprising:
one or more processors configured to:
compensate for timing misalignment of subframes associated with at least one of a first user equipment (UE) or the second UE, wherein the first UE and the second UE are in direct UE-to-UE communication, and a timing for the first UE and a timing for the second UE are derived from an eNode B (eNB); and
transmit, by the second UE, subframes including guard periods, wherein each guard period is at least one of one or more contiguous symbols at a beginning of a subframe or one or more contiguous symbols at an end of a subframe.

16. The second UE of claim 15, wherein compensating for timing misalignment comprises compensating for a timing offset between the timing of the first UE and the timing of the second UE.

17. The second UE of claim 16, wherein compensating for a timing offset comprises adjusting a transmit time.

18. The second UE of claim 17, the processors further operable to:
receive, from the first UE, a timing reference signal (RS);
measure, by the second UE, the timing offset between the first UE and the second UE; and
adjust, by the second UE, the transmit time of the second UE using the timing offset.

19. The second UE of claim 18, wherein resources used for the timing RS are signaled, by the eNB, to the first UE and the second UE.

20. The second UE of claim 17, the processors further operable to:
transmit, by the second UE, a timing RS;
receive, from the first UE, the timing offset between the first UE and the second UE; and
adjust, by the second UE, the transmit time of the second UE using the timing offset.

21. The second UE of claim 20, wherein resources used for the timing RS are signaled, by the eNB, to the first UE and the second UE.

22. The second UE of claim 15, the processors further operable to:
determine one or more contiguous physical resource block (PRB) groups allocated to the IDS; and
for each group of contiguous PRBs, allocate, as guard subcarriers, at least one of subcarriers with lowest indices in said each PRB group or subcarriers with highest indices in said each PRB group.

23. The second UE of claim 16, wherein compensating for timing offset comprises adjusting a receive timing.

24. The second UE of claim 23, the processors further operable to:
receive, from the first UE, a timing RS; and
adjust, by the second UE, the receive timing for the second UE.

25. The second UE of claim 24, wherein resources used for the timing RS are signaled, by the eNB, to the first UE and the second UE.

26. The second UE of claim 15, wherein a guard period is one or more contiguous symbols at an end of a subframe, and the processors further operable to:
determine a sounding reference signal (SRS) is being transmitted in the subframe; and transmit the SRS in the last symbol of the subframe, wherein transmitting the SRS overrides the last symbol of the guard period.

27. The second UE of claim 26, the processors further operable to add a guard period at a beginning of a subframe following the subframe including the SRS.

28. The second UE of claim 15, the processors further operable to:
receive, from the eNB, by the first UE, information identifying a size of a physical downlink control channel (PDCCH) for a subsequent subframe; and
add, by the first UE, a guard period in a beginning of a subframe used for direct UE-to-UE communication to the second UE, the guard period being equal to or greater than the size of the PDDCH for the subsequent subframe.

* * * * *